United States Patent
Gonnsen (10) Patent No.: US 10,577,108 B2
(45) Date of Patent: Mar. 3, 2020

(54) AIRCRAFT MONUMENT, AIRCRAFT GALLEY, AIRCRAFT, AND METHOD OF OPERATING AN AIRCRAFT MONUMENT

(71) Applicant: Airbus Operations GmbH, Hamburg (DE)

(72) Inventor: Johannes Gonnsen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 338 days.

(21) Appl. No.: 15/602,374

(22) Filed: May 23, 2017

(65) Prior Publication Data
US 2017/0341750 A1  Nov. 30, 2017

(30) Foreign Application Priority Data
May 24, 2016 (EP) .................................. 16171140

(51) Int. Cl.
B64D 11/04 (2006.01)
B64D 11/00 (2006.01)

(52) U.S. Cl.
CPC .............. B64D 11/04 (2013.01); *B64D 11/00* (2013.01); *B64D 2011/0046* (2013.01)

(58) Field of Classification Search
CPC ............ B65D 11/04; B65D 2011/0046; B65D 2011/0069
See application file for complete search history.

(56) References Cited

U.S. PATENT DOCUMENTS

| | | | |
|---|---|---|---|
| 8,122,823 B2 * | 2/2012 | Cunningham | B30B 9/301 100/226 |
| 8,146,859 B2 * | 4/2012 | Mariat | B64D 11/04 244/118.5 |
| 2010/0181425 A1 | 7/2010 | Guering et al. | |
| 2011/0210203 A1 * | 9/2011 | Chua | B61D 37/006 244/118.5 |
| 2013/0076214 A1 | 3/2013 | Chamberlin et al. | |
| 2013/0270983 A1 | 10/2013 | Godecker et al. | |
| 2014/0008492 A1 | 1/2014 | Ehlers et al. | |
| 2016/0167784 A1 | 6/2016 | Schliwa et al. | |

FOREIGN PATENT DOCUMENTS

| | | |
|---|---|---|
| DE | 102011013049 | 9/2012 |
| WO | 2010021594 | 2/2010 |
| WO | 2012040564 | 3/2012 |
| WO | 2015014850 | 2/2015 |

OTHER PUBLICATIONS

European Search Report, dated Oct. 27, 2016, priority document.

* cited by examiner

*Primary Examiner* — Richard R. Green
*Assistant Examiner* — Steven J Shur
(74) *Attorney, Agent, or Firm* — Greer, Burns & Grain, Ltd.

(57) ABSTRACT

An aircraft monument comprising a desk and a movable part that is mounted to the aircraft monument by means of an attachment device. The movable part is pivotable about an axis between a first position in which the movable part covers a first area of the desk and is essentially arranged inside of the aircraft monument such that its front faces in a first direction towards the back of the aircraft monument, and a second position in which the movable part is at least partially arranged outside of the aircraft monument and its front faces in a second direction that crosses the first direction. The movable part, in its second position, covers a second area of the desk that is less than the first area.

14 Claims, 6 Drawing Sheets

AIRCRAFT MONUMENT, AIRCRAFT GALLEY, AIRCRAFT, AND METHOD OF OPERATING AN AIRCRAFT MONUMENT

CROSS-REFERENCES TO RELATED APPLICATIONS

This application claims the benefit of the European patent application No. 16 171 140.3 filed on May 24, 2016, the entire disclosures of which are incorporated herein by way of reference.

BACKGROUND OF THE INVENTION

The present invention concerns an aircraft monument, an aircraft galley having the aircraft monument, an aircraft having such aircraft monument and/or such aircraft galley, as well as a method of operating such aircraft monument.

In modern aircraft, functional units, such as kitchen units (galleys), toilet units (lavatories), or stowage units, are usually designed as so called aircraft monuments. Such aircraft monuments are, for example, described in documents DE 10 2011 013 049 A1 and WO 2015/014850 A1. Typically, these aircraft monuments are block-shaped, and arranged such as to extend from the passenger cabin floor to the ceiling of the passenger cabin, and between the aircraft cabin outer wall and an aisle of the aircraft or, in larger aircraft having two aisles, optionally also between the aisles. Being arranged in this manner, the aircraft monuments essentially divide the aircraft cabin into a plurality of seat blocks, such as for different seating classes. The monuments are constituted by a plurality of parts fit to the aircraft monument in a closely packed manner.

Figure 1:
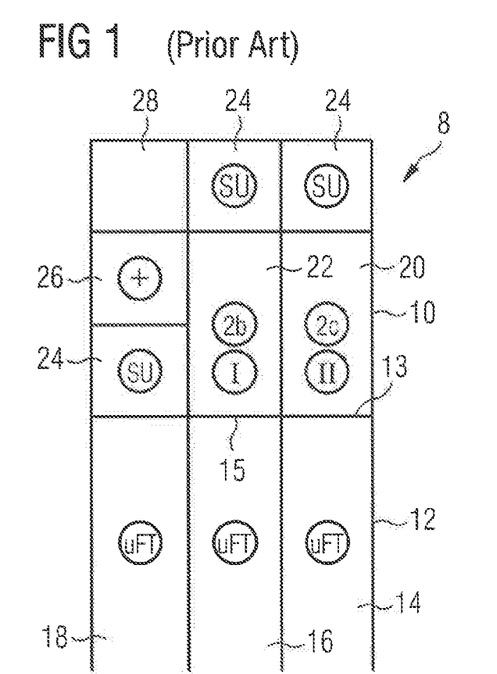
FIGS. 1 and 2 show a conventional aircraft monument and a conventional aircraft galley.
Figure 2:
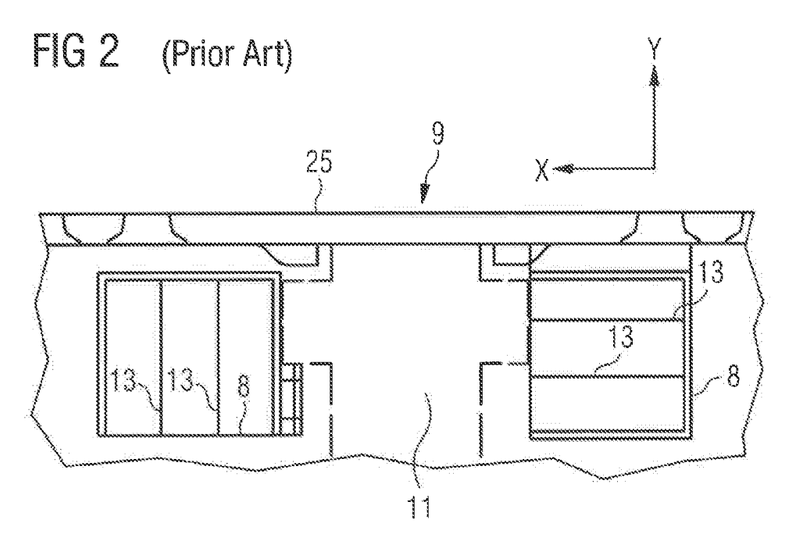

Examples of a conventional aircraft monument 8 and a conventional aircraft galley 9 are shown in FIGS. 1 and 2. FIG. 1 illustrates schematically the architecture of an aircraft monument 8 in a front view, which monument 8 is generally divided into an upper section 10 and a lower section 12, and comprises a plurality of walls 13 separating box-shaped compartments. In the lower section 10, three such compartments are formed, together fitting three equally sized trolleys 14, 16, 18. The trolleys are provided for carrying supplies, e.g., meals or medical equipment for the passengers or other items required by the staff on board the aircraft. The upper section 10 is separated from the lower section 12 by one of the walls 13 that is arranged horizontally. In the compartments of the upper section 10, various galley inserts are arranged, namely a 3-mode-fridge 20, a steam oven 22, three further galley inserts in the form of so called standard units 24, a non-electric galley insert 26, as well as a control unit 28. The front surface of each of these galley inserts is essentially coplanar with the front surface of each of the trolleys 14, 16, 18.

As shown in FIG. 2, the aircraft galley 9 comprises two aircraft monuments 8. The aircraft monument 8 shown on the left hand side of FIG. 2 is arranged with its front, i.e., its side by which the galley inserts are to be accessed and operated and by which the trolleys can be inserted into and taken out of the respective second section, being parallel to the flight direction of the aircraft (i.e., the longitudinal direction of the aircraft). Accordingly, the (front of this) monument is accessed from an aisle 25 of the aircraft. The further aircraft monument 8 shown on the right-hand side of FIG. 2 is arranged perpendicularly to the latter aircraft monument 8, thus, such that its front is perpendicular to the flight direction (i.e., parallel to the transversal direction of the aircraft). This further aircraft monument is accessed via an entrance area 11 connecting an aircraft door (not shown) with the aisle 25 of the passenger cabin.

SUMMARY OF THE INVENTION

The present invention is directed to an object of providing an aircraft monument that can be used more flexibly without requiring a large amount of construction space. Furthermore, the invention is directed to an object of providing an aircraft galley with such an aircraft monument, an aircraft having an aircraft galley and/or an aircraft monument of the aforementioned kind, and a method of operating an aircraft monument in this manner.

The aircraft monument comprises a desk and a movable part. The movable part is mounted to the aircraft monument by means of an attachment device such that the movable part is pivotable about an axis between a first position and a second position. In its first position, the movable part covers a first area of the desk and is essentially arranged inside of the aircraft monument. In this position, the front (side) of the movable part faces in a first direction towards the back of the aircraft monument. When the aircraft monument is arranged in a transversal direction of the aircraft cabin, the first direction corresponds to the longitudinal direction of the aircraft cabin. In the present context, the front of the aircraft monument is the side by which the aircraft monument is operated. In particular, the front of the aircraft monument is the aircraft monument side by which any devices forming part of the aircraft monument, other than devices fit in the movable part, are intended to be operated.

Essentially arranged inside means, in the present context, a situation in which the movable part is deposited in the aircraft monument when the movable part is stowed away, for example, during taxi, take-off and landing of the aircraft. In this situation, the front of any component of the aircraft monument comprised in the movable part is not directly accessible for passengers and the cabin crew. For example, in the first position, the movable part may be positioned such that at least 90% of its base surface overlaps with the desk. The mobile part may project beyond a front edge of the desk by up to about 10 cm. Alternatively, when the movable part is essentially arranged inside of the aircraft monument, the movable part may be entirely arranged above the desk, i.e., such that the movable part does not project beyond the front edge of the desk. Thus, the base surface of the movable part may completely overlap the desk.

In the second position of the movable part, this part is essentially arranged outside of the aircraft monument and its front (side) faces in a second direction that crosses the first direction. In analogy to the above definition of the term "essentially inside," essentially arranged outside means in the present context that only a minor part of the basis of the movable part overlaps with the desk. In particular, more than half of the movable part may project beyond the front edge of the desk in this situation. In other words, in the second position, the movable part covers a second area of the desk that is less than the first area. Particularly, the second area may be at most half or one third of the first area. In this case, the axis is preferably arranged offset relative to the front edge of the desk towards the center of the desk. This design is preferred when the movable part is rather heavy. Thus, in an embodiment, the movable part may partly rest on the desk. On the other hand, if the second area is even smaller, e.g. null or not at all, the movable part is essentially supported by the attachment device such as to be suspended hanging freely beyond the front edge of the desk in its second position.

In an embodiment, the movable part is pivotable about the axis by an angle of at least 80°. Preferably, the angle by which the movable part is pivotable about the axis is at least 90°, particularly about 90°. Thus, the second direction may be essentially perpendicular to the first direction. Accordingly, the movable part may be designed such that its front, which is to be accessed for operating any devices arranged therein, may be rotated about the axis to become accessible only in the second position. Particularly, the front (side) of the movable part may be inaccessible when the movable part is in its first position inside of the aircraft monument. This allows for restricting access to the devices arranged in the movable part.

Advantageously, the axis is aligned perpendicularly to the desk. The axis may intersect a plane that is parallel to the surface of the desk, particularly in the proximity of a corner of the aircraft monument and/or of a front edge of the desk.

Furthermore, it is conceivable that the aircraft monument comprises a working space for catering service operation in the form of a cavity arranged above the desk. Optionally, the movable part is at least partially arranged within this working space, when it is located in its first position. In other words, in the first position, the movable part may take a volume of this cavity, and free at least a part of this volume, optionally the whole volume, when it is in its second position. If the movable part carries one or more of the devices of the aircraft monument, the total space provided to the cabin crew for catering services is essentially increased when the movable part is in its second position in which it clears a part of the cavity, thus, a part of the desk.

Preferably, the movable part is or comprises one or more of the following devices: a bun warmer, a galley insert, a galley electrical insert, a galley non-electrical insert, a cooling device, a steam oven, a convection oven, a microwave oven, a toaster, a water heater, a coffee maker, an espresso maker, a beverage maker, a cooling device such as an ice drawer, a fridge, a freezer or a wine chiller, a hot cup, a cabinet with further expositions such as watches and/or pencils, a touchpad, a flight attendant panel, a remote control center, a display, and a service machine. The service machine may be provided for personal cleaning needs and body care, noise protection, medicine, first aid, newspapers, books, and/or exposed smart phone functions to be sold as files (as apps, movies, music, information, entertainment, games). In an embodiment, the service machine is a self-service machine, e.g., a vending machine.

Furthermore, it is conceivable that the movable part comprises a body having a compartment in which one of the aforementioned devices fits. For example, the movable part may comprise a body adapted to hold at least one galley insert, and/or a body adapted to hold at least one aircraft galley standard unit. In particular, the movable part may have an opening on its front through which one of the above mentioned devices may be inserted into the movable part.

In an embodiment, the movable part is attached to the attachment device by additional holding means, such as by a screw or adhesive connection. The movable part may be formed integrally with the attachment device. Furthermore, the attachment device may comprise a first hinge element attached to a section of the aircraft monument as well as a second hinge element attached to the movable part by the holding means. The first and second hinge elements may be adapted to interact with each other so that the movable part is pivotable about the axis. For example, the first hinge element may comprise a shaft rigidly fixed to the aircraft monument which may be in engagement with a sleeve rigidly fixed to the movable part. In particular, the shaft may extend through the entire sleeve and may optionally be mount to the desk of the aircraft monument. E.g., the shaft may be in threaded engagement with the desk.

Furthermore, the first hinge element may be attached to the aircraft monument on two sections thereof that are spatially separated from each other. For example, if the aircraft monument comprises the aforementioned cavity, these sections may be arranged on opposite sides of the cavity. In particular, the shaft may be attached to the aircraft monument at or below the desk and above the cavity, e.g., to a top portion of the aircraft monument, such as to an overhanging portion thereof.

In a further embodiment, the aircraft monument may comprise a locking mechanism configured to retain the movable part from pivoting about the axis at least when the movable part is in its first position or in its second position. Optionally, the locking mechanism may be adapted to retain the movable part in both, the first and the second position. The locking mechanism may comprise a latch, e.g., positioned proximate to a front edge of the desk. Moreover, the locking mechanism may be formed integrally with the attachment device. Preferably, the locking mechanism is reversible, and optionally blockable by means of a key.

An aircraft galley comprises at least one aircraft monument described above in details. For example, the aircraft galley may comprise two aircraft monuments, which may be arranged opposite of one another such as to face each other. In this case, the movable part of the first aircraft monument is preferably movable towards the second aircraft monument, and the movable part of the second aircraft monument is movable towards the first aircraft monument. Advantageously, the movable parts of the aircraft monuments are pivotably mounted to the aircraft monument such that, in their second position, they are arranged proximate to each other with their fronts facing in the same, common second direction.

In a further embodiment of an aircraft galley, the body of the movable part is designed with six compartments, thus, comprises two additional compartments arranged in parallel and next to the previously described four compartments. Also in each of the two additional compartments, one non-electrical galley insert (NELI) standard unit is provided. Moreover, the movable part of this aircraft galley comprises a bun warmer as previously described in details. This bun warmer is arranged in parallel and adjacent to the two additional compartments, and offset from the front of the movable part towards the back of the movable part. In the upper section above the desk, two lateral compartments and the galley inserts arranged therein are offset in the Y-direction versus the remaining compartments and galley inserts of the upper section towards the back of the aircraft monument. Thus, when the movable part is in its first position inside the galley monument, the shape of the movable part is essentially complementary to the shape of the cavity.

An aircraft has at least one aircraft monument and/or at least one aircraft galley as previously described in details. The aircraft monument and/or the aircraft galley may be positioned between an aisle of the aircraft and the cabin outer wall, or between two aisles of the aircraft.

Further, a method of operating an aircraft monument previously described in details is provided for controlling access to the front of the movable part of the aircraft monument. The method comprises the step of pivoting the movable part about the axis into its first position to restrict access to the front of the movable part, and/or pivoting the movable part about the axis into its second position to provide access to the front of the movable part.

BRIEF DESCRIPTION OF THE DRAWINGS

Preferred embodiments of an aircraft monument and an aircraft galley are described in greater detail with reference to the attached schematic drawings in the following, wherein.

DETAILED DESCRIPTION OF THE PREFERRED EMBODIMENTS

Figure 3:
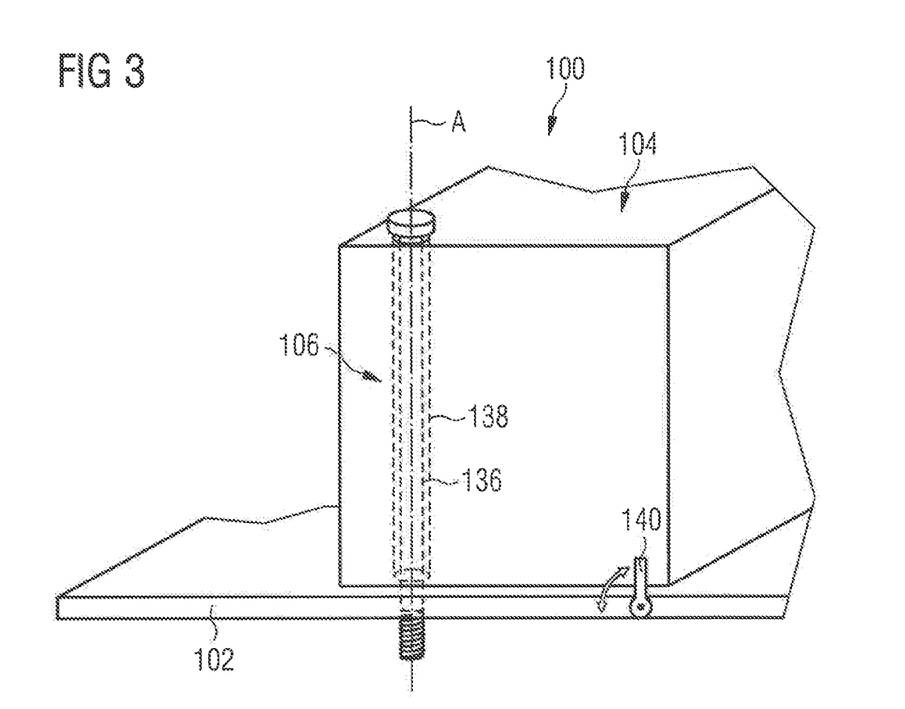
FIG. 3 shows a partial perspective view of an aircraft monument, wherein a movable part of the aircraft monument is shown in its first position inside of the aircraft monument.
Figure 4:
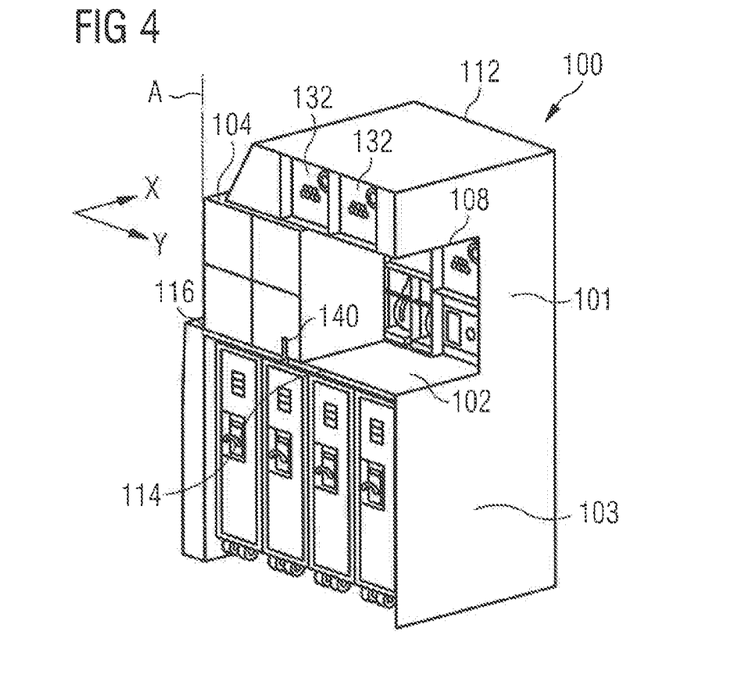
FIG. 4 shows a perspective view of the aircraft monument according to FIG. 3, wherein the movable part is shown in its first position.
Figure 5:
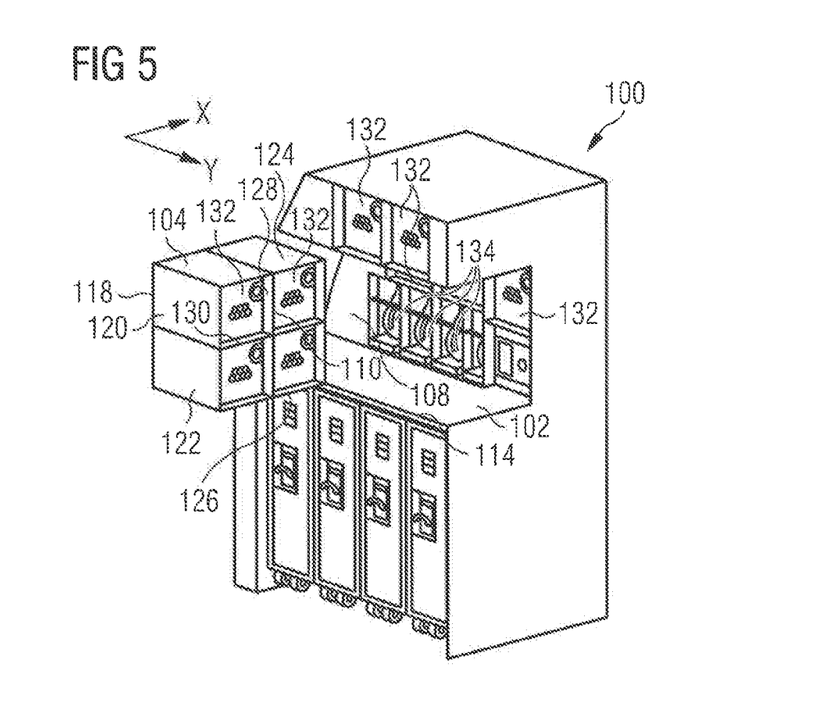
FIG. 5 shows a perspective view of the aircraft monument according to FIG. 3, wherein the movable part is shown in its second position in which it is arranged outside of the aircraft monument.

FIGS. 3 to 5 show an aircraft monument 100 that comprises a desk 102 and a movable part 104. The desk delimits an upper section 101 of the aircraft monument 100 from a lower section 103 of the aircraft monument 100, in which lower section 103 four conventional aircraft trolleys are stowed. The movable part 104 is mounted to the aircraft monument 100 by means of an attachment device 106 (see FIG. 3) such as to be pivotable about an axis A between a first position shown in FIG. 4 and a second position shown in FIG. 5. In its first position, the movable part 104 covers a first area (about half of the surface) of the desk 102 and is arranged inside of the aircraft monument 100, namely in a cavity 108 that is provided for catering surface operation in the upper section 101. In this position, the front 110 of the movable part faces towards the back 112 of the aircraft monument 100, i.e., in a first direction X.

In its second position shown in FIG. 5, the movable part 104 is extending beyond the surface of the desk 102, such that it is arranged outside of the cavity 108, hence, outside of the aircraft monument 100. In this situation, the movable part 104 is arranged such that its front 110 faces in a second direction Y that is essentially perpendicular to the first direction X. In this position, the movable part 104 essentially does not cover the desk 102 anymore, but its side wall is approximately parallel to the front of the aircraft monument 100. Accordingly, the cabin crew is provided with more desk space for preparing meals or drinks for the passengers. In particular, the first area of the desk 102 previously covered by the movable part 104 can now be used for temporarily setting goods such as drink cans. Thereby, the side wall of the movable part 104 facing in the first direction X advantageously prevents the goods from falling off the desk 102.

The axis A is aligned perpendicularly to the desk 104, and intersects the plane of the surface of the desk 102 proximate to a front edge 114 of the desk 102 at a corner 116 of the aircraft monument 100. As shown in FIGS. 4 and 5, the movable part 104 can be turned by about 90° about the axis A. Accordingly, also the front 110 is movable from its first position shown in FIG. 4, in which the front 110 of the movable part 104 is not accessible by cabin crew or passengers, to the second position shown in FIG. 5, in which the front 110 of the movable part 104 can be easily accessed.

The movable part 104 of the aircraft monument 100 essentially comprises a body 118 designed with four compartments 120, 122, 124, 126 delimited by walls 128, 130. In each of the compartments 120, 122, 124, 126, one non-electrical galley insert (NELI) standard unit 132 is provided. Further compartments adapted to hold standard units 132 are provided in the upper section 101 of the aircraft monument 100. Also in the upper section 101 are arranged three coffee machines 134. Two of these coffee machines 134 as well as one of the standard units 132 are covered by the movable part 104 when the latter is in its first position. Thus, in general, the movable part 104 is adapted to cover a part of the aircraft monument 100.

The attachment device 106 comprises a shaft 136 that is rigidly fixed to the desk 102 of the aircraft monument 100. Furthermore, the attachment device 106 comprises a sleeve 138 that is rigidly fixed to, in particular formed integrally with, the movable part 104. As shown in FIG. 3, the sleeve 138 is essentially designed as a bore extending through the movable part 104. Accordingly, the shaft 136 is connected to the desk 102 by a threaded engagement. The shaft 136 essentially extends through the sleeve 138 along the axis A.

Furthermore, the aircraft monument 100 comprises a reversible locking mechanism comprising a latch 140 (shown only in FIGS. 3 and 4) that is arrangable for hindering the movable part 104 from rotating about the axis A between its first and its second position. Furthermore, the locking mechanism comprises rotation limiting means (not shown in the figures), which may be associated with the attachment device, to limit the rotation of the movable part to a predefined angle, which is, e.g., about 90° in the aircraft monument 100. Thus, the rotation limiting means cooperate with the latch 140 to keep the movable part 104 in its first and second positions by blocking a counter-clockwise rotation of the movable part 104 beyond its first position and a clock-wise rotation of the movable part 104 beyond its second position.

Figure 6:
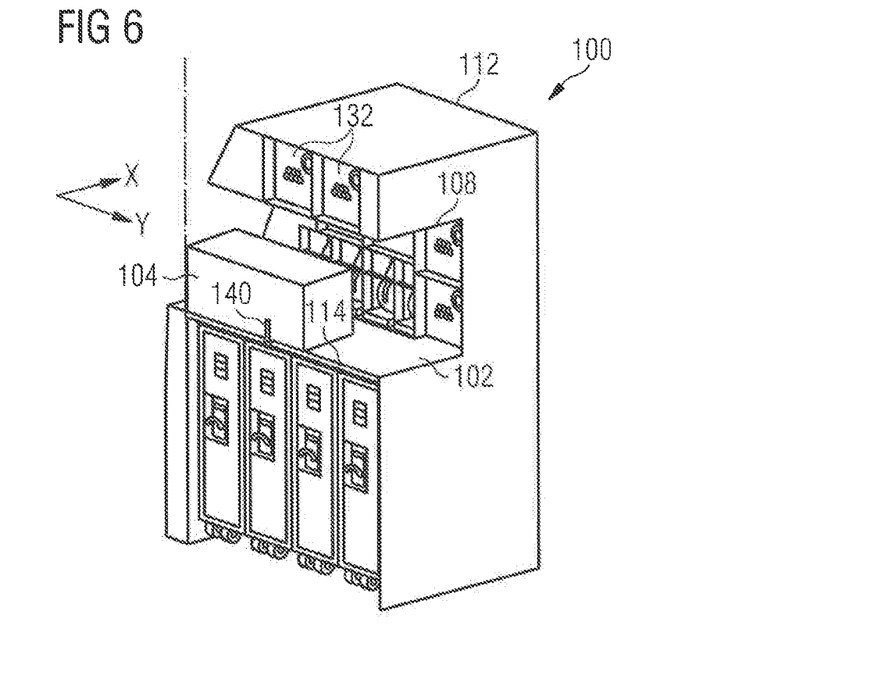
FIG. 6 shows a perspective view of an alternative aircraft monument, wherein the movable part is shown in its first position in which it is arranged inside of the aircraft monument.
Figure 7:
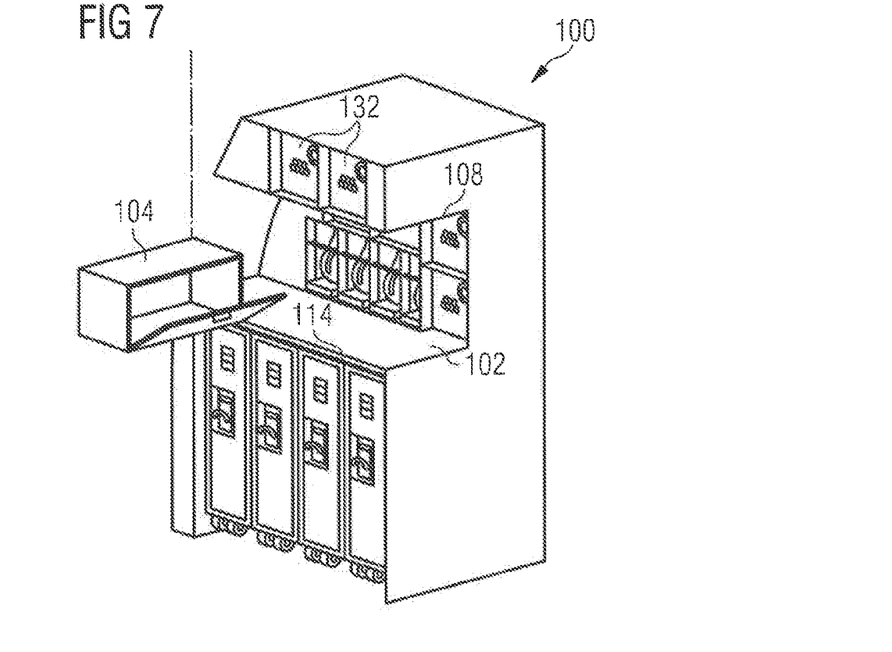
FIG. 7 shows a perspective view of the aircraft monument according to FIG. 6, wherein the movable part is shown in its second position in which it is arranged outside of the aircraft monument.

An alternative aircraft monument 100 is shown in FIGS. 6 and 7. In this aircraft monument 100, the movable part 104 is a bun warmer. This movable part 104 is smaller in size than the movable part 104 of the aircraft monument 100 of FIGS. 3 to 5, and, thus, covers less area of the desk 102, when arranged in its first position inside the aircraft monument 100.

Otherwise, the structure and function of the alternative aircraft monument 100 corresponds to the structure and function of the aircraft monument 100 of FIGS. 3 to 5.

Figure 8:
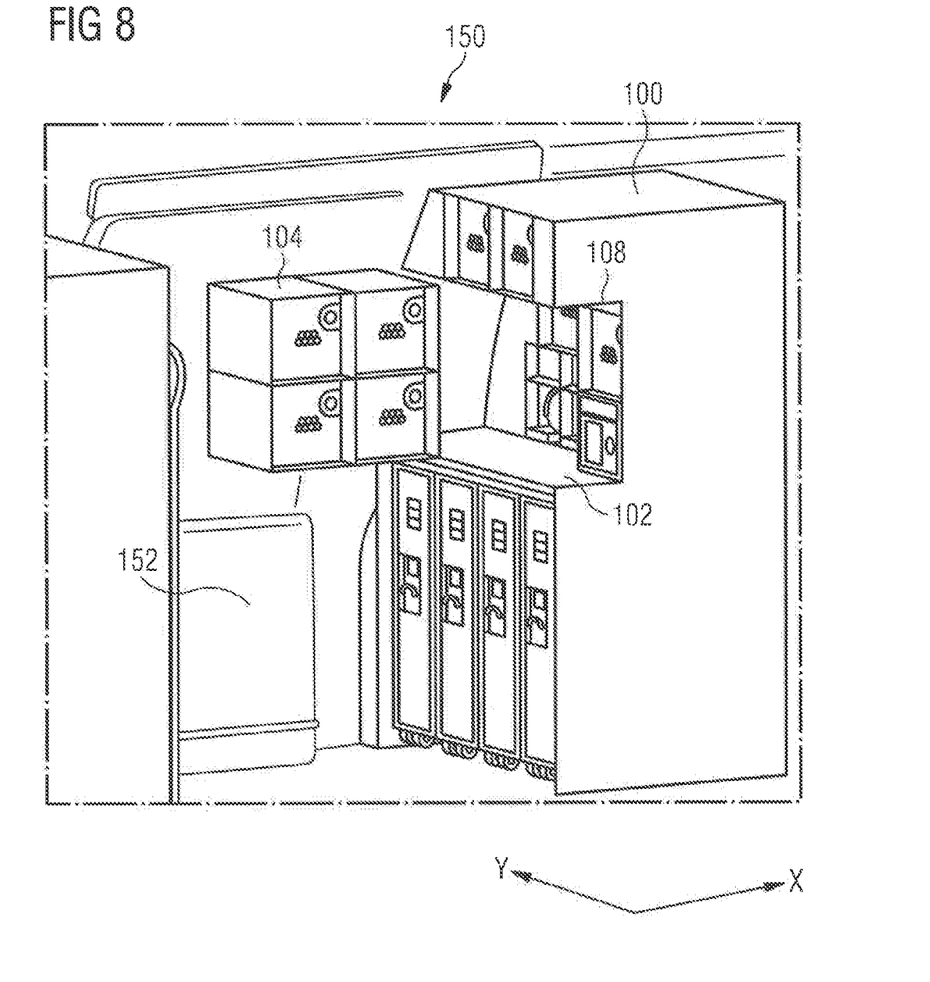
FIG. 8 shows a perspective view of an aircraft galley, comprising the aircraft monument according to FIG. 3, wherein the movable part is shown in its second position.

FIG. 8 shows a perspective view of an aircraft galley 150 located in the proximity of an aircraft entrance area next to an aircraft door 152, wherein the movable part 104 is arranged in its second position. In the aircraft galley 150, the aircraft monument 100 is arranged transversally, i.e., such that its front is perpendicular to the flight direction of the aircraft. The aircraft galley 150 comprises only one of the aforementioned aircraft monuments 100. However, it is also conceivable that a second aircraft monument 100 is arranged opposite of the first aircraft monument 100 such that these two aircraft monuments 100 face each other and their movable parts are pivotable about respective axes into their second position to be arranged proximate to each other.

During the course of the flight, the aircraft galley 150 can be used such that the movable part 104 remains in its first position inside the aircraft monument 100 during taxi and take-off, i.e., in situations in which catering services are not provided. After the aircraft has reached its cruising altitude, the latch 140 can be turned and the movable part rotated towards the aircraft door 152, whereafter the movable part can be locked in its second position by the reversible locking mechanism. In this situation, the free desk space is enlarged, so that cabin crew can, for example, comfortably prepare meals. After finishing the catering services, the movable part can be turned back to its first position, and respectively locked in place. Accordingly, if the movable part comprises, e.g., devices exclusively provided for the cabin crew, access to these devices can be effectively restricted, which is advantageous for long distance overnight flights.

Figure 9:
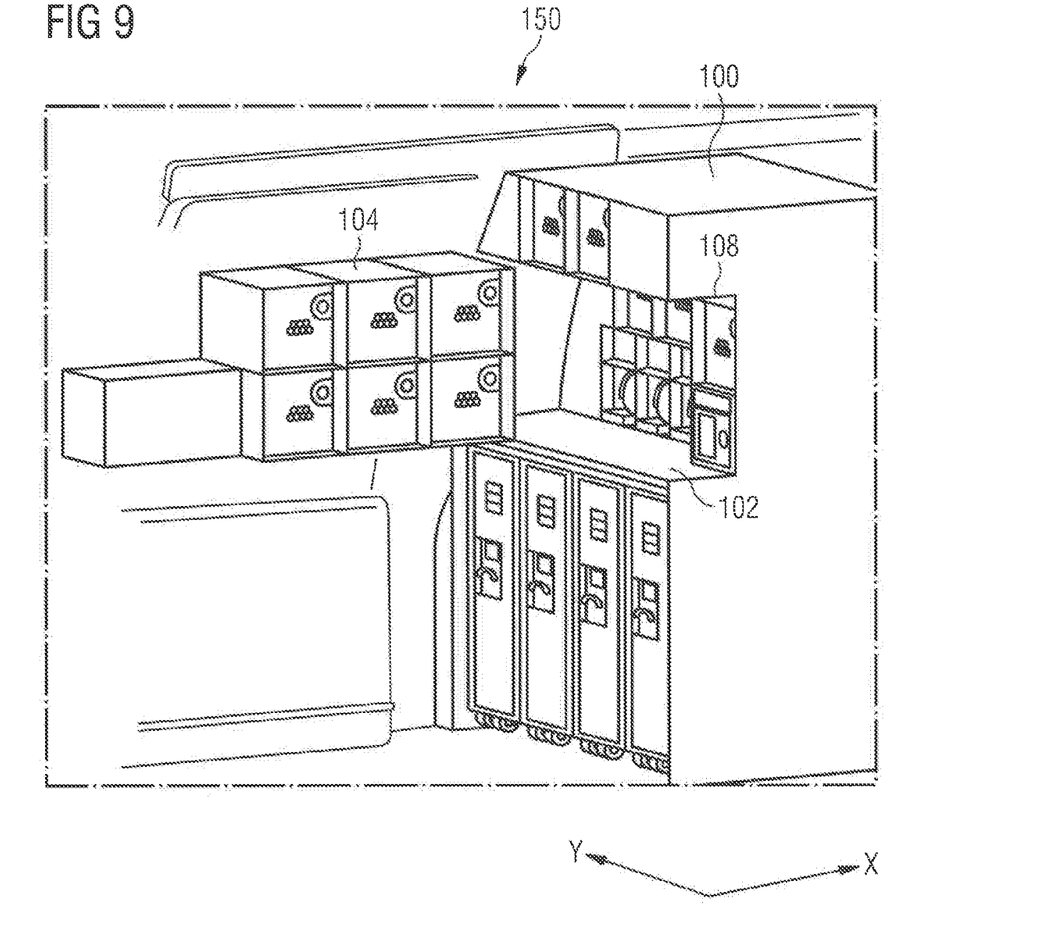
FIG. 9 shows a perspective view of an alternative aircraft galley, wherein the movable part is shown in its second position.

In an alternative of an aircraft galley 150 shown in FIG. 9, the body 118 of the movable part 104 is designed with six compartments, thus, comprises two additional compartments arranged in parallel and next to the previously described four compartments 120, 122, 124, 126. Also in each of the two additional compartments, one non-electrical galley insert (NELI) standard unit is provided. Moreover, the movable part 104 of this aircraft galley comprises a bun warmer as previously described in details. This bun warmer is arranged in parallel and adjacent to the two additional compartments, and offset from the front of the movable part 104 towards the back of the movable part 104. In the upper section 101 above the desk 102, two lateral compartments and the galley inserts arranged therein (in FIG. 9 the compartments above the desk farthest to the right) are offset in the Y-direction versus the remaining compartments and galley inserts of the upper section towards the back of the aircraft monument 100. Thus, when the movable part 104 is in its first position inside the galley monument 100, the shape of the movable part 104 is essentially complementary to the shape of the cavity 108.

Otherwise, the structure and function of the alternative aircraft galley 150 shown in FIG. 9 corresponds to the structure and function of the aircraft galley 150 of FIG. 8.

Moreover, it is conceivable that the movable part 104 of a further alternative of an aircraft galley 150 lacks the bun warmer or the two additional compartments with galley inserts of the aircraft galley 150 shown in FIG. 9 but comprises the remaining features of this aircraft galley 150.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft monument, comprising
a desk, and
a movable part that is mounted to the aircraft monument by means of an attachment device such that the movable part is pivotable about an axis between
a first position in which the movable part covers a first area of the desk and is essentially arranged inside of the aircraft monument such that its front faces in a first direction towards the back of the aircraft monument, and
a second position in which the movable part is at least partially arranged outside of the aircraft monument and its front faces in a second direction that crosses the first direction, wherein the movable part, in its second position, covers a second area of the desk that is less than the first area, wherein the axis intersects a plane which is parallel to the surface of the desk, wherein the axis intersects the plane in at least one of a corner of the aircraft monument or a front edge of the desk,
wherein the movable part comprises at least one of the following elements: a bun warmer, a galley insert, a galley electrical insert, a galley non-electrical insert, a cooling device, a steam oven, a convection oven, a touchpad, a flight attendant panel, a remote control center, a display, a self-service machine, a vending machine.

2. The aircraft monument according to claim 1, wherein the axis is arranged perpendicularly to the desk.

3. The aircraft monument according to claim 1, wherein the movable part is pivotable about the axis by an angle of at least 80°.

4. The aircraft monument according to claim 1, wherein the second area is at most one third of the first area.

5. The aircraft monument according to claim 1, wherein the aircraft monument comprises a working space for catering service operation in the form of a cavity arranged above the desk, wherein the movable part, in its first position, is at least partially arranged within the working space.

6. The aircraft monument according to claim 1, wherein the front of the movable part is inaccessible when the movable part is in its first position inside of the aircraft monument.

7. The aircraft monument according to claim 1, wherein the movable part is at least in sections formed integrally with the attachment device.

8. The aircraft monument according to claim 1, wherein the attachment device comprises a first hinge element attached to a section of the aircraft monument, and a second hinge element provided to the movable part, wherein the first and second hinge elements are adapted to interact with each other so that the movable part is pivotable.

9. The aircraft monument according to claim 8, wherein the first hinge element comprises a shaft rigidly fixed to the aircraft monument, in which the shaft is in engagement with a sleeve forming part of the second hinge element, in which the sleeve is rigidly fixed to the movable part.

10. The aircraft monument according to claim 1, further comprising a reversible locking mechanism that is configured to retain the movable part, when it is in at least one of the first or second position, from pivoting about the axis.

11. An aircraft galley comprising at least one aircraft monument according to claim 1.

12. An aircraft having at least one aircraft monument according to claim 1.

13. An aircraft having at least one aircraft galley according to claim 11.

14. A method of operating an aircraft monument according to claim 1 for controlling access to the front of the movable part of the aircraft monument, comprising at least one of the following steps:
- pivoting the movable part about the axis into its first position to restrict access to the front of the movable part, and
- pivoting the movable part about the axis into its second position to provide access to the front of the movable part.

* * * * *